(12) United States Patent
Wang et al.

(10) Patent No.: US 12,117,656 B2
(45) Date of Patent: Oct. 15, 2024

(54) OPTICAL CONNECTOR FERRULE AND OPTICAL CONNECTOR

(71) Applicant: HUAWEI TECHNOLOGIES CO., LTD., Guangdong (CN)

(72) Inventors: Baoqi Wang, Dongguan (CN); Chong Chen, Dongguan (CN); Junying Zhao, Dongguan (CN); Fanhua Kong, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 17/966,479

(22) Filed: Oct. 14, 2022

(65) Prior Publication Data
US 2023/0036226 A1 Feb. 2, 2023

Related U.S. Application Data

(63) Continuation of application No. PCT/CN2020/139235, filed on Dec. 25, 2020.

(30) Foreign Application Priority Data

Apr. 17, 2020 (CN) .......................... 202010306153.4

(51) Int. Cl.
*G02B 6/38* (2006.01)

(52) U.S. Cl.
CPC ......... *G02B 6/3881* (2013.01); *G02B 6/3885* (2013.01)

(58) Field of Classification Search
CPC .. G02B 6/3881; G02B 6/3885; G02B 6/3834; G02B 6/3837; G02B 6/3882; G02B 6/383; G02B 6/3869; G02B 6/38
See application file for complete search history.

(56) References Cited

U.S. PATENT DOCUMENTS 11,650,375 B2 * 5/2023 Uehara ................ G02B 6/3834
   385/78
2010/0322562 A1 12/2010 Barnes et al.
(Continued)

FOREIGN PATENT DOCUMENTS

| CN | 201508424 U | 6/2010 |
|---|---|---|
| CN | 105607193 A | 5/2016 |

(Continued)

OTHER PUBLICATIONS

Suematsu et al., "Super Low-Loss, Super High-Density Multi-Fiber Optical Connectors," Furukawa Review, 2003, 23:53-58.
(Continued)

*Primary Examiner* — John Bedtelyon
(74) *Attorney, Agent, or Firm* — Fish & Richardson P.C.

(57) ABSTRACT

Example optical connector ferrules and example optical connectors are provided. An example optical connector ferrule is a first ferrule of an optical connector, where the first ferrule includes n optical channels, and the first ferrule is configured to be compatible with a second ferrule. The second ferrule includes m optical channels, where both m and n are positive integers, and n is greater than m. The n optical channels of the first ferrule include first-type optical channels and second-type optical channels, where an arrangement manner of the first-type optical channels is the same as that of the m optical channels of the second ferrule, and at least one of the second-type optical channels is located in at least one of rows in which the first-type optical channels are located.

20 Claims, 11 Drawing Sheets

(56) References Cited

U.S. PATENT DOCUMENTS

| | | |
|---|---|---|
| 2016/0223760 A1 | 8/2016 | Moriyama et al. |
| 2018/0045898 A1 | 2/2018 | Barwicz et al. |
| 2019/0113691 A1 | 4/2019 | Konegawa et al. |

FOREIGN PATENT DOCUMENTS

| | | |
|---|---|---|
| CN | 108089270 A | 5/2018 |
| CN | 108398751 A | 8/2018 |
| CN | 208737044 U | 4/2019 |
| JP | H11510270 A | 9/1999 |
| JP | 2002333547 A | 11/2002 |
| JP | 2006163210 A | 6/2006 |
| JP | 2010243946 A | 10/2010 |
| JP | 2017021184 A | 1/2017 |
| JP | 2018084694 A | 5/2018 |
| KR | 20010002760 A | 1/2001 |
| WO | 2017179485 A1 | 10/2017 |

OTHER PUBLICATIONS

Anonymous, "IEC," Draft CDV of 62496-4-214, 2019, 16 pages.
Pitwon, "Liaison Report, EU H2020 and US HDPuG Updates," IEC TC86 / Joint Working Group 9 Meeting, Expo, Shanghai, China, Oct. 16, 2019, 63 pages.
Kolesar, "400GBASE-SR16 Cabling," IEEE P802.3bs, Sep. 2014, 29 pages.
Extended European Search Report in European Appln No. 20930681.0, dated Aug. 11, 2023, 8 pages.
Office Action in Japanese Appln. No. 2022-562861, mailed on Dec. 19, 2023, 7 pages (with English translation).
Office Action in Korean Appln. No. 10-2022-7039881, mailed on Aug. 19, 2024, 15 pages (with English translation).

* cited by examiner

OPTICAL CONNECTOR FERRULE AND OPTICAL CONNECTOR

CROSS-REFERENCE TO RELATED APPLICATIONS

This application is a continuation of international Application No. PCT/CN2020/139235, filed on Dec. 25, 2020, which claims priority to Chinese Patent Application No. 202010306153.4, filed on Apr. 17, 2020. The disclosures of the aforementioned applications are hereby incorporated by reference in their entireties.

TECHNICAL FIELD

This application relates to the field of optical communication technologies, and in particular, to an optical connector ferrule and an optical connector.

BACKGROUND

Optical communication is a communication manner in which a light wave is used as a carrier. An optical connector is a passive optical component configured to continue an optical link to implement optical communication, and can be repeatedly used. As a data transmission rate and a bandwidth are increasingly high, a requirement for a fiber quantity of a monolithic ferrule (Monolithic Ferrule, MT ferrule) in the optical connector is also increasingly high, and the fiber quantity of the MT ferrule evolves in an increasing direction, for example, increases from 12 to 24. However, a next-generation MT ferrule with a larger quantity of fibers is usually incompatible with a current-generation MT ferrule with a smaller quantity of fibers. Referring to FIG. 1, a 32-fiber MT ferrule is incompatible with a 16-fiber MT ferrule due to symmetrical distribution.

Currently, in an existing manner, compatibility of an MT ferrule may be improved by increasing an optical channel row quantity of the MT ferrule. As shown in FIG. 2, an extension direction of a center connection line of two guide holes with larger diameters is a row direction, and a direction perpendicular to the direction of the center connection line of the two guide holes is a column direction. It can be learned, with reference to FIG. 2, that an MT ferrule with three rows of optical channels is compatible with an MT ferrule with two rows of optical channels, and is also compatible with an MT ferrule with one row of optical channels. When a transmission rate requirement and a bandwidth requirement are further improved, it is further proposed that a solution of five rows, seven rows, nine rows, or even more technology rows may be designed to implement forward compatibility. For example, an MT ferrule with nine rows of optical channels is compatible with MT ferrules with one row, two rows, three rows, five rows, and seven rows of optical channels.

It is found through research that when an optical channel row quantity reaches at least 3, optical channel accuracy of an MT ferrule is greatly reduced. It can be learned that, in the implementation in which compatibility of a ferrule is improved by increasing an optical channel row quantity, the optical channel row quantity is limited, and a compatibility effect is poor.

SUMMARY

To resolve the foregoing technical problem, this application provides an optical connector ferrule and an optical connector, to implement compatibility of an optical connector ferrule with a larger quantity of fibers with an optical connector ferrule with a smaller quantity of fibers.

The optical connector ferrule provided in this application corresponds to a first ferrule of the optical connector, and the first ferrule includes n optical channels.

The first ferrule is configured to be compatible with a second ferrule, the second ferrule includes m optical channels, both m and n are positive integers, and n is greater than m.

The n optical channels of the first ferrule include first-type optical channels and second-type optical channels, an arrangement manner of the first-type optical channels is the same as that of the m optical channels of the second ferrule, and at least one of the second-type optical channels is located in at least one of rows in which the first-type optical channels are located.

The first ferrule provided in this application implements compatibility with the second ferrule with a smaller quantity of fibers by using the m first-type optical channels. In addition, because the at least one of the second-type optical channels is located in the at least one of the rows in which the first-type optical channels are located, an optical channel density of the first ferrule in the at least one row is greater than that of the second ferrule, so that the first ferrule can be interconnected to the second ferrule or another ferrule (for example, an n-fiber third ferrule whose optical channel arrangement manner is consistent with that of the first ferrule) in a row direction. Therefore, in this application, a ferrule compatibility requirement is met by increasing an optical channel density. In addition, compatibility of the ferrule provided in this application does not depend on increasing an optical channel row quantity, so that optical channel accuracy of the ferrule is not affected.

Preferably, that at least one of the second-type optical channels is located in at least one of rows in which the first-type optical channels are located specifically includes: the at least one of the second-type optical channels is located between two adjacent first-type optical channels in the row direction.

In this implementation, because the at least one of the second-type optical channels is located between the two adjacent first-type optical channels in the row direction, it is equivalent that at least one second-type optical channel is inserted between two adjacent first-type optical channels in the row direction, to reduce a minimum optical channel spacing in the row direction, thereby increasing an optical channel arrangement density in the row direction. The increasing the optical channel arrangement density in the row direction (for example, reducing a spacing between adjacent optical channels to a half of a spacing between the first-type optical channels) does not affect optical channel accuracy, and also improves compatibility of the first ferrule with at least one ferrule whose fiber quantity is less than n.

Preferably, an optical channel row quantity of the first ferrule is the same as an optical channel row quantity of the second ferrule.

Preferably, an optical channel row quantity of the first ferrule is greater than an optical channel row quantity of the second ferrule.

In this application, an arrangement manner of each optical channel in the first ferrule may be set based on an optical channel arrangement manner of the second ferrule that needs to be compatible. Specific arrangement manners of the first-type optical channels and the second-type optical channels are not limited herein.

Preferably, there is an equal spacing between every two adjacent optical channels in a same row in the n optical channels, and there is an equal spacing between every two adjacent optical channels in a same row in the m optical channels.

Preferably, a spacing between every two adjacent optical channels in all rows in the n optical channels is d1, a spacing between every two adjacent optical channels in all rows in the m optical channels is d2, d1 is 1/K times of d2, and K is a positive integer greater than or equal to 2.

Preferably, the n optical channels are n optical waveguide channels; and the first ferrule further includes a substrate, and the n optical waveguide channels are disposed on the substrate.

Preferably, the first ferrule further includes a body base and an upper cover.

A groove is disposed on the body base, the substrate is assembled into the groove, a bottom surface of the substrate is bonded to a bottom of the groove, and at least one first positioning mechanism is disposed on a bonding surface of the groove with the substrate; and a second positioning mechanism that matches the first positioning mechanism is disposed on the substrate, and the first positioning mechanism matches the second positioning mechanism to fasten the substrate and the groove. The upper cover fits with the body base to fasten the substrate.

In the foregoing implementation, the body base and the upper cover jointly assemble the substrate and the n optical waveguide channels on the substrate together, so that the substrate and the n optical waveguide channels on the substrate can be protected and fastened.

Preferably, the second positioning mechanism includes a positioning wedge located in the groove, the first positioning mechanism includes a positioning groove located on the substrate, and the positioning wedge matches the positioning groove. A pair of mutually matched positioning groove and positioning wedge are used, so that accuracy of optical channel matching between the ferrules can be improved, thereby improving matching efficiency of the first ferrule with an optical connector ferrule with a same quantity of fibers, or improving an optical channel compatibility matching effect of the first ferrule with the second ferrule.

Preferably, the second positioning mechanism further includes a positioning post located in the groove, the first positioning mechanism further includes a positioning hole located on the substrate, and the positioning post matches the positioning hole. The positioning post is additionally disposed to match the positioning hole, thereby further ensuring accuracy of matching between the two interconnected ferrules.

Preferably, a tail jacket is disposed on the substrate to protect the substrate; and in a length direction of the first ferrule, a length sum obtained after the body base is assembled with the tail jacket is greater than a length of the substrate. The tail jacket is additionally disposed on the substrate, so that durability of the substrate and the optical waveguides formed on the substrate can be improved, thereby prolonging a service life of the first ferrule.

Preferably, the n optical channels are n fiber channels, and the first ferrule further includes a body.

The n fiber channels are disposed on the body, and two sides of the body include guide holes.

When the first ferrule is connected to the second ferrule, the guide holes are configured to match guide pins disposed on the second ferrule, to perform positioning.

Preferably, the n fiber channels are formed through injection molding by using a die core block, both an upper surface and a lower surface of the die core block are serrated, and the n fiber channels are connected optical channels and both upper surfaces and lower surfaces of the n fiber channels are serrated.

Preferably, then fiber channels are formed through injection molding by using a die core block, both an upper surface and a lower surface of the die core block are arched, and the n fiber channels are connected optical channels and both upper surfaces and lower surfaces of the n fiber channels are arched.

The n fiber channels are formed by using the die core block, so that channel accuracy of a single fiber channel can be effectively prevented from being affected in an injection molding process.

Preferably, a diameter of the fiber channel is less than or equal to 125 μm.

The optical connector provided in this application includes a first ferrule and a second ferrule, and the first ferrule and the second ferrule are connected together to form the optical connector. The first ferrule is the optical connector ferrule according to any one of the implementations provided in the foregoing aspect.

Preferably, the second ferrule is also an optical connector ferrule according to any one of the implementations provided in the foregoing aspect.

According to the optical connector provided in this application, the first ferrule may be used to be compatible with the second ferrule with a smaller quantity of fibers. The second ferrule may be an existing previous-generation m-fiber ferrule product, or max be an m-fiber ferrule that also has a compatibility function with a ferrule with a smaller quantity of fibers. The optical connector in the technical solutions of this application is applied, so that compatibility with ferrules with a plurality of quantities of fibers is significantly improved. In addition, because of relatively high optical channel accuracy, the optical connector has a low loss and a high yield. Furthermore, the optical connector is applicable to diversified application scenarios, thereby expanding an application scope of the connector.

This application has at least the following advantages:

The first ferrule of the optical connector provided in this application is an n-fiber ferrule and has the n optical channels. The first ferrule is configured to be compatible with an m-fiber ferrule, namely, the second ferrule, with a smaller quantity of fibers. The n optical channels of the first ferrule include two types, and the arrangement manner of the first-type optical channels is the same as that of the m optical channels of the second ferrule. Therefore, the first ferrule can implement accurate interconnection to the m optical channels of the second ferrule by using only the first-type optical channels, to be compatible with the second ferrule with the smaller quantity of fibers. In addition, the n optical channels of the first ferrule further include the second-type optical channels, the at least one of the second-type optical channels is located in the at least one of the rows in which the first-type optical channels are located, and an optical channel arrangement density of the first ferrule in the row in which the second-type optical channel is located is greater than an optical channel arrangement density of the second ferrule in a corresponding row. Therefore, the first ferrule may be alternatively interconnected to optical channels of another ferrule by using both (some or all of) the first-type optical channels and (some or all of) the second-type optical channels. For example, the first ferrule is interconnected to optical channels of a third ferrule, and a fiber quantity of the third ferrule is n. It can be learned that, compatibility of the first ferrule is improved by increasing an optical channel arrangement density in the row direction of the first ferrule, so that the first ferrule can be interconnected to ferrules with a plurality of quantities of fibers. In the technical solutions of this application, implementation of compatibility of the first ferrule does not depend on increasing an optical channel row quantity. Therefore, optical channel accuracy is prevented from being affected while compatibility is implemented.

DESCRIPTION OF EMBODIMENTS

Figure 1:
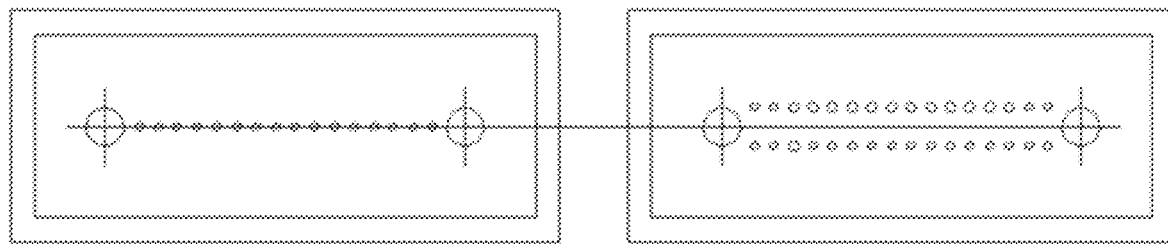
FIG. 1 is a schematic diagram in which a 32-fiber MT ferrule is incompatible with a 16-fiber MT ferrule.
Figure 2:
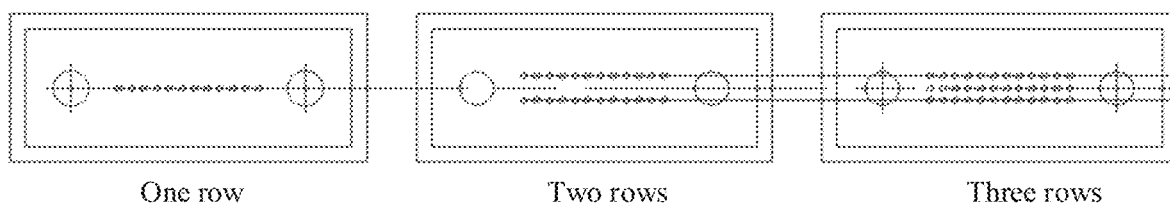
FIG. 2 is a schematic diagram in which an MT ferrule with three rows of optical channels is compatible with an MT ferrule with one row of optical channels and an MT ferrule with two rows of optical channels.

An MT ferrule is a core component of a multi-fiber push on (Multi-fiber Push On, MPO) connector. The MT ferrule is a mechanical interconnection transmission ferrule, and has one or more rows of optical channels. These optical channels are used to implement optical signal connection and transmission. As a product of the MT ferrule iteratively updates, a higher requirement is put forward for compatibility of the MT ferrule. "Compatibility" in the embodiments of this application indicates that in a scenario in which optical connectors fit with each other, two optical connector ferrules with different quantities of optical channels can be interconnected, and some optical channels or all optical channels stably work. Compatibility herein is compatibility between optical channels in a row direction. The row direction is a relatively well-known concept in the art, and reference can be made to the explanation in the background part. Details are not described herein again. For example, an optical connector ferrule with n optical channels may fit with an optical connector ferrule with m optical channels (n is greater than m), and implement optical signal interworking of the m optical channels, to stably work.

As described above, a ferrule with a larger quantity of fibers is enabled to have compatibility with a ferrule with a smaller quantity of fibers by increasing an optical channel row quantity. However, currently, after a quantity of die core pin rows in an MT ferrule production die increases, it is difficult to fill an injection molding material. Therefore, injection molding pressure needs to be increased, and consequently die core pins are prone to deformation. Die core pin accuracy directly determines optical channel accuracy of an MT ferrule obtained after injection molding, and affects a loss and a yield of an optical connector. Therefore, the manner of increasing an optical channel row quantity cannot effectively resolve a compatibility problem of a ferrule with a larger quantity of fibers with a ferrule with a smaller quantity of fibers while ensuring channel accuracy.

In view of this, embodiments of this application provide an optical connector ferrule and an optical connector. n optical channels of a first ferrule (an n-fiber ferrule) of the optical connector are specifically classified into two types. An arrangement manner of first-type optical channels is the same as that of in optical channels of a second ferrule (an m-fiber ferrule). Therefore, the first ferrule can implement compatibility with the second ferrule by using the first-type optical channels. At least one of second-type optical channels of the first ferrule is located in at least one of rows in which the first-type optical channels are located. Therefore, an optical channel arrangement density in the at least one row of the first ferrule is greater than an optical channel arrangement density in a corresponding row of the second ferrule. Therefore, the first ferrule can implement not only compatibility with the second ferrule but also interconnection to optical channels of a plurality of types of ferrules by using relatively dense optical channels of the first ferrule in a row direction. Compared with implementing ferrule compatibility by increasing an optical channel row quantity, in the technical solutions provided in the embodiments of this application, an optical channel row quantity does not need to be increased, and the first ferrule with more dense optical channels is implemented only in the row direction, thereby implementing compatibility of the first ferrule with the second ferrule. The solutions can effectively prevent ferrule compatibility from affecting optical channel accuracy of the optical connector ferrule. It is worthwhile to note that a fiber quantity is consistent with a channel quantity in the optical connector ferrule. For example, the optical connector ferrule has 48 fibers, that is, the optical connector ferrule includes 48 optical channels.

To enable a person skilled in the art to better understand the technical solutions provided in the embodiments of this application, the following first describes a structure of the optical connector.

Figure 3:
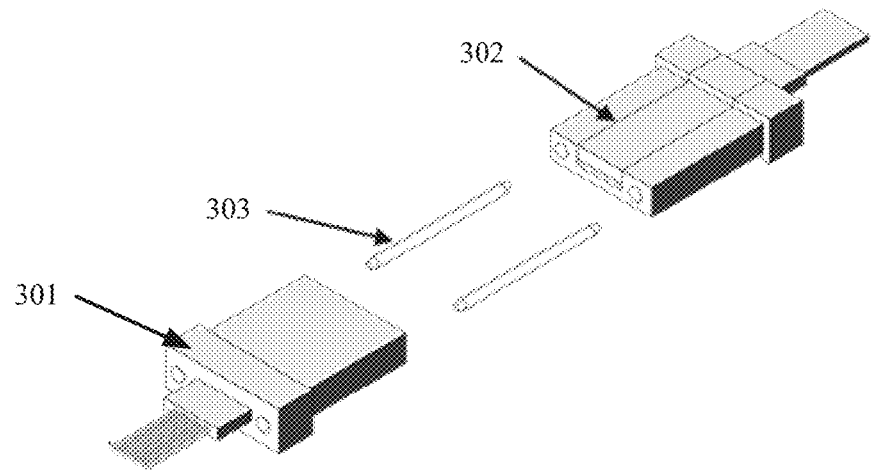
FIG. 3 is a schematic diagram of a structure of an optical connector according to an embodiment of this application.

FIG. 3 is a schematic diagram of a structure of an optical connector according to an embodiment of this application.

As shown in FIG. 3, the optical connector includes a first ferrule 301 and a second ferrule 302. Holes to be sleeved onto guide pins 303 are respectively disposed in the first ferrule 301 and the second ferrule 302. The first ferrule 301 is assembled with the second ferrule 302 by using the guide pins 303, and implements matching of all or some optical channels. An optical connection is implemented between the first ferrule 301 and the second ferrule 302 through optical channel matching.

In the optical connector shown in FIG. 3, an optical channel quantity of the first ferrule 301 may be the same as or different from an optical channel quantity of the second ferrule 302.

When the optical channel quantities are the same, optical channels of the first ferrule 301 match optical channels of the second ferrule 302 in a one-to-one manner. For example, the first ferrule 301 and the second ferrule each include 48 optical channels.

When the optical channel quantities are different, in the first ferrule 301 and the second ferrule 302, only some optical channels of a ferrule with a larger quantity of optical channels match optical channels of a ferrule with a smaller quantity of optical channels in a one-to-one manner, and a quantity of matched optical channels is consistent with the optical channel quantity of the ferrule with the smaller quantity of optical channels. For example, the first ferrule 301 includes 48 optical channels, and the second ferrule 302 includes 24 optical channels. This requires that the first ferrule 301 is compatible with the second ferrule 302, so that 24 optical channels of the first ferrule 301 can match the 24 optical channels of the second ferrule 302. In addition, if the second ferrule 302 needs to be assembled with a third optical connector ferrule (not shown in FIG. 3) with a smaller quantity of fibers to form an optical connector, the second ferrule 302 is required to also have compatibility with the third optical connector ferrule.

To implement compatibility of an optical connector ferrule with a ferrule with a smaller quantity of fibers (optical channels), the following describes an implementation of compatibility of an n-fiber optical connector ferrule with an m-fiber optical connector ferrule with reference to embodiments and accompanying drawings. In the embodiments of this application, both n and m are positive integers, and n is greater than m. In the following embodiment descriptions, the n-fiber optical connector ferrule is the foregoing first ferrule, and the m-fiber optical connector ferrule is the foregoing second ferrule.

Figure 4:
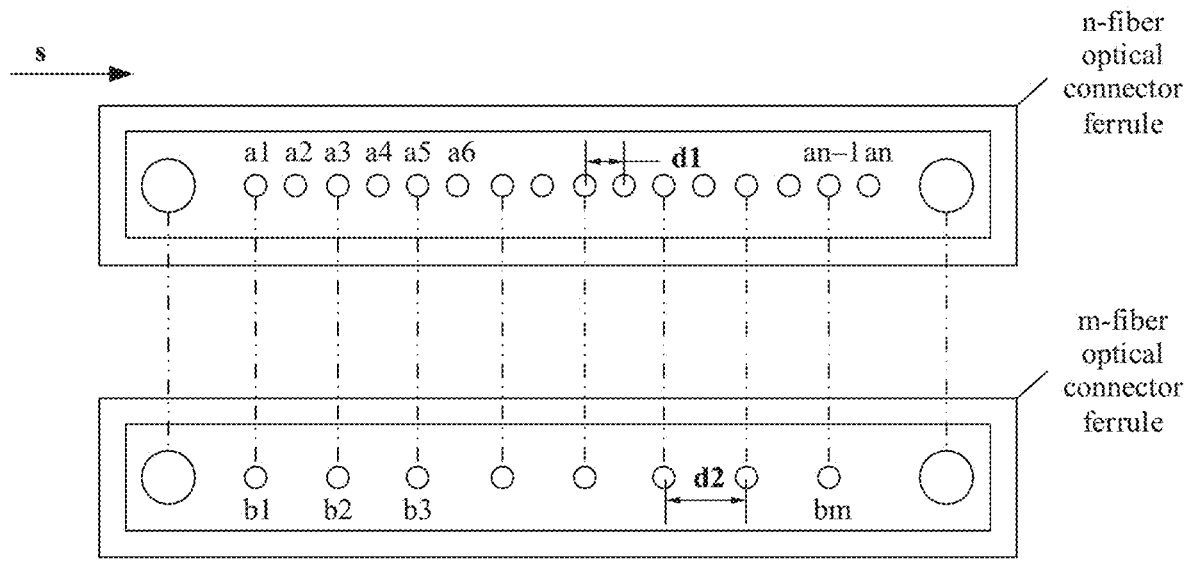
FIG. 4 is a schematic diagram of an n-fiber optical connector ferrule compatible with an m-fiber optical connector ferrule by using odd-numbered optical channels according to an embodiment of this application.

FIG. 4 is a schematic diagram of a structure of an n-fiber optical connector ferrule compatible with an m-fiber optical connector ferrule according to an embodiment of this application. In FIG. 4, the m-fiber optical connector ferrule is further shown below the n-fiber optical connector ferrule.

The n-fiber optical connector ferrule shown in FIG. 4 includes n optical channels: an optical channel a1, an optical channel a2, . . . , and an optical channel an. In this example, n is an even number. In the n-fiber optical connector ferrule shown in FIG. 4, the optical channels a1 to an are located in a same row. First-type optical channels are odd-numbered optical channels in a1 to an: a1, a3, and an−1. Second-type optical channels are even-numbered optical channels in a1 to an: a2, a4, . . . , and an. The m-fiber optical connector ferrule includes m optical channels: an optical channel b1, an optical channel b2, . . . , and an optical channel bm. The m optical channels are located in a same row. As shown in FIG. 4, an arrangement manner of the odd-numbered optical channels of the n-fiber optical connector ferrule is the same as that of b1 to bm.

A direction shown by an arrow s in FIG. 4 is used as a row direction. In the row direction, the first-type optical channels and the second-type optical channels of the n-fiber optical connector ferrule are alternately arranged. A spacing between adjacent optical channels of the n-fiber optical connector ferrule is d1, a spacing between adjacent optical channels of the in-fiber optical connector ferrule is d2, and d1 is 1/K times of d2. K is a positive integer greater than or equal to 2. In the example in FIG. 4, K=2. The odd-numbered optical channels of the n-fiber optical connector ferrule in the row direction are in a one-to-one correspondence with the optical channels of the m-fiber optical connector ferrule. As shown in FIG. 4, a1 matches b1, a3 matches b2, and a5 matches b3.

Figure 5:
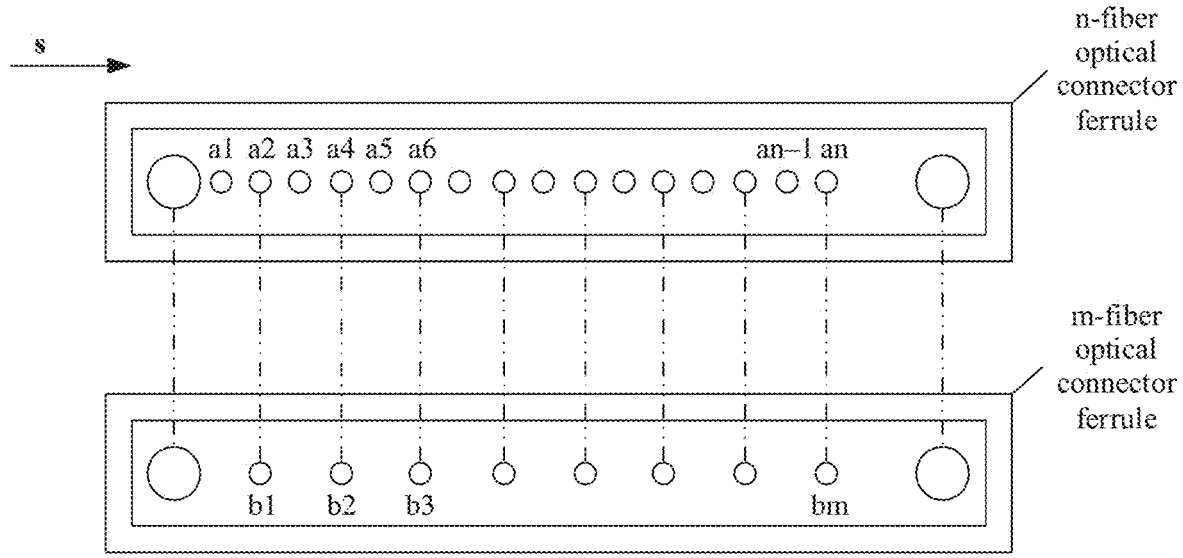
FIG. 5 is a schematic diagram of an n-fiber optical connector ferrule compatible with an m-fiber optical connector ferrule by using even-numbered optical channels according to an embodiment of this application.

Similarly, optical channel positions of an n-fiber optical connector ferrule may be disposed, so that even-numbered optical channels of the n-fiber optical connector ferrule in a row direction are in a one-to-one correspondence with optical channels of an m-fiber optical connector ferrule. As shown in FIG. 5, a2 matches b1, a4 matches b2, and a6 matches b3. In the example in FIG. 5, n is an even number, and in the n-fiber optical connector ferrule, the even-numbered optical channels a2, a4, and an are used as first-type optical channels, and odd-numbered optical channels a1, a3, . . . , and an−1 are used as second-type optical channels.

In the n-fiber optical connector ferrule shown in FIG. 4 and FIG. 5, there is a same spacing between adjacent optical channels. In addition, there may be alternatively different spacings between adjacent optical channels. For example, a spacing between a1 and a2 is d3, a spacing between a2 and a3 is d4, and d3≠d4.

Figure 6:
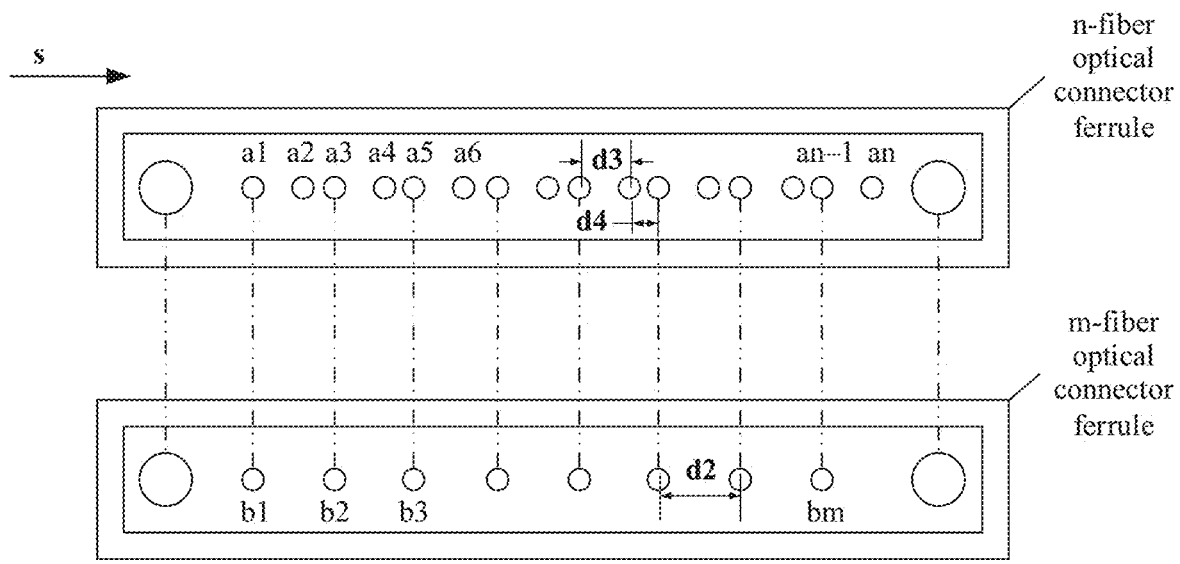
FIG. 6 is a schematic diagram of an n-fiber optical connector ferrule compatible with an m-fiber optical connector ferrule by using a changed optical channel spacing according to an embodiment of this application.

Referring to FIG. 6, in this figure, a spacing between adjacent optical channels of an n-fiber optical connector ferrule in a row direction transitionally changes, and values of spacings are d3, d4, d3, d4, d4, and d3 in sequence. A spacing between adjacent odd-numbered optical channels is equal to a spacing between adjacent even-numbered optical channels and both the spacings are equal to d3+d4, and d3+d4=d2. In the n-fiber optical connector ferrule shown in FIG. 6, d3 is greater than d4. In addition, in an n-fiber optical connector ferrule in another example form, d4 may be alternatively greater than d3.

The n-fiber optical connector ferrule shown in FIG. 4 to FIG. 6 each include one row of optical channels. When an n-fiber optical connector ferrule includes one row of optical channels and an m-fiber optical connector also includes one row of optical channels, second-type optical channels and first-type optical channels are arranged in a same row.

In some other embodiments, optical channels of an n-fiber optical connector ferrule may be distributed in a plurality of rows. In the following embodiment, two rows of optical channels are used as an example for description.

Figure 7:
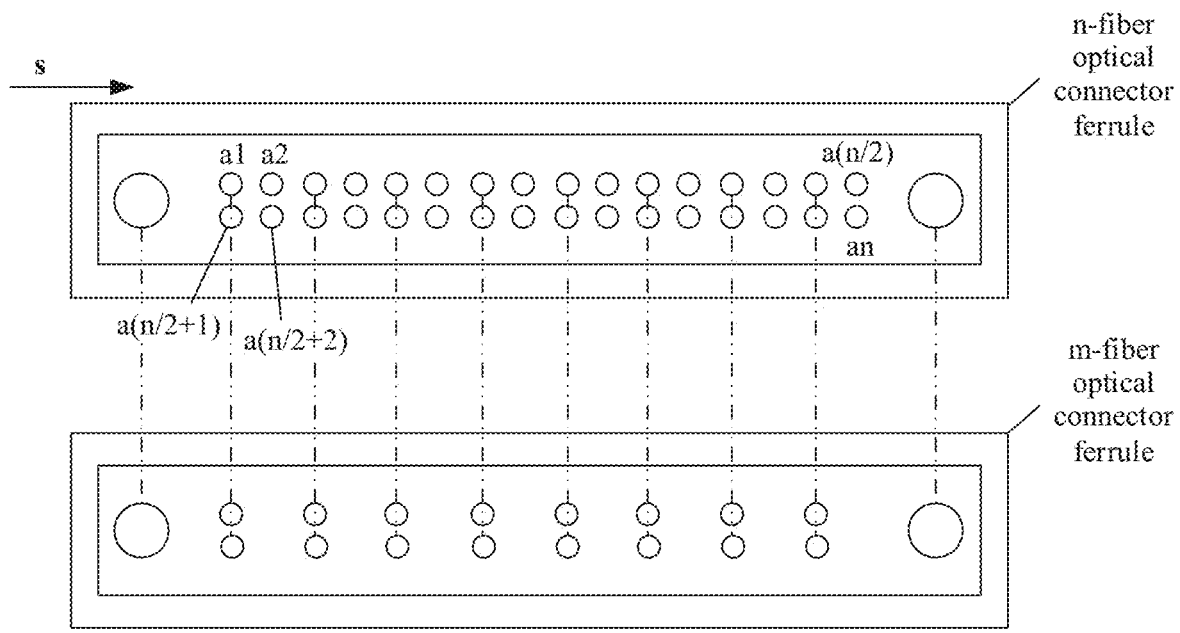
FIG. 7 is a schematic diagram of a structure of a two-row n-fiber optical connector ferrule compatible with an m-fiber optical connector ferrule according to an embodiment of this application.

FIG. 7 is a schematic diagram of a structure of a two-row n-fiber optical connector ferrule compatible with an m-fiber optical connector ferrule according to an embodiment of this application. In this example, n is an even number.

The two-row n-fiber optical connector ferrule shown in FIG. 7 includes n optical channels: an optical channel a1, an optical channel a2, . . . , an optical channel a(n/2), an optical channel a(n/2+1), an optical channel a(n/2+2), . . . , and an optical channel an. In the n-fiber optical connector ferrule shown in FIG. 5, there are a total of n/2 optical channels in each row, the optical channels a1 to a(n/2) are located in the first row, and the optical channels a(n/2+1) to an are located in the second row. In the example in FIG. 7, in a row direction, odd-numbered optical channels in each row of the n-fiber optical connector ferrule are first-type optical channels, and even-numbered optical channels in each row are second-type optical channels. It can be learned from FIG. 7 that an arrangement manner of first-type optical channels is the same as that of m optical channels of the m-fiber optical connector ferrule.

When an optical channel row quantity of an n-fiber optical connector ferrule is the same as an optical channel row quantity of an m-fiber optical connector ferrule and the row quantity is an integer greater than 1, second-type optical channels are located in at least one of rows in which first-type optical channel are located. In the example in FIG. 7, an optical channel row quantity is 2, and second-type optical channels are distributed in both the first row and the second row. Certainly, in some other embodiments, second-type optical channels may be distributed in only the first row or only the second row.

In FIG. 7, a spacing between adjacent optical channels of the two-row n-fiber optical connector ferrule is less than a spacing between adjacent optical channels of the two-row m-fiber optical connector ferrule in the row direction. In the row direction, an optical channel quantity of the n-fiber optical connector ferrule is greater than an optical channel quantity of the m-fiber optical connector ferrule, and the n-fiber optical connector ferrule includes m optical channels corresponding to optical channel positions of the m-fiber optical connector ferrule. Therefore, the n-fiber optical connector ferrule is compatible with the m-fiber optical connector ferrule. As shown in FIG. 7, an optical channel arrangement density of the n-fiber optical connector ferrule in each row is greater than an optical channel arrangement density of the m-fiber optical connector ferrule in a corresponding row, and the n-fiber optical connector ferrule in this figure may be further interconnected, by using the first-type optical channels and the second-type optical channels of the n-fiber optical connector ferrule, to another n-fiber optical connector ferrule whose all channels are arranged in a same manner.

As separately shown in FIG. 4 to FIG. 7, an optical channel quantity of an n-fiber optical connector ferrule is twice an optical channel quantity of an m-fiber optical connector ferrule, and an optical channel row quantity of the n-fiber optical connector ferrule is equal to an optical channel row quantity of the m-fiber optical connector ferrule. The n-fiber optical connector ferrule is compatible with the m-fiber optical connector ferrule with a same quantity of rows.

In some possible embodiments, an optical channel row quantity of an n-fiber optical connector ferrule may be alternatively inconsistent with an optical channel row quantity of an m-fiber optical connector ferrule with which the n-fiber optical connector ferrule needs to be compatible.

Figure 8A:
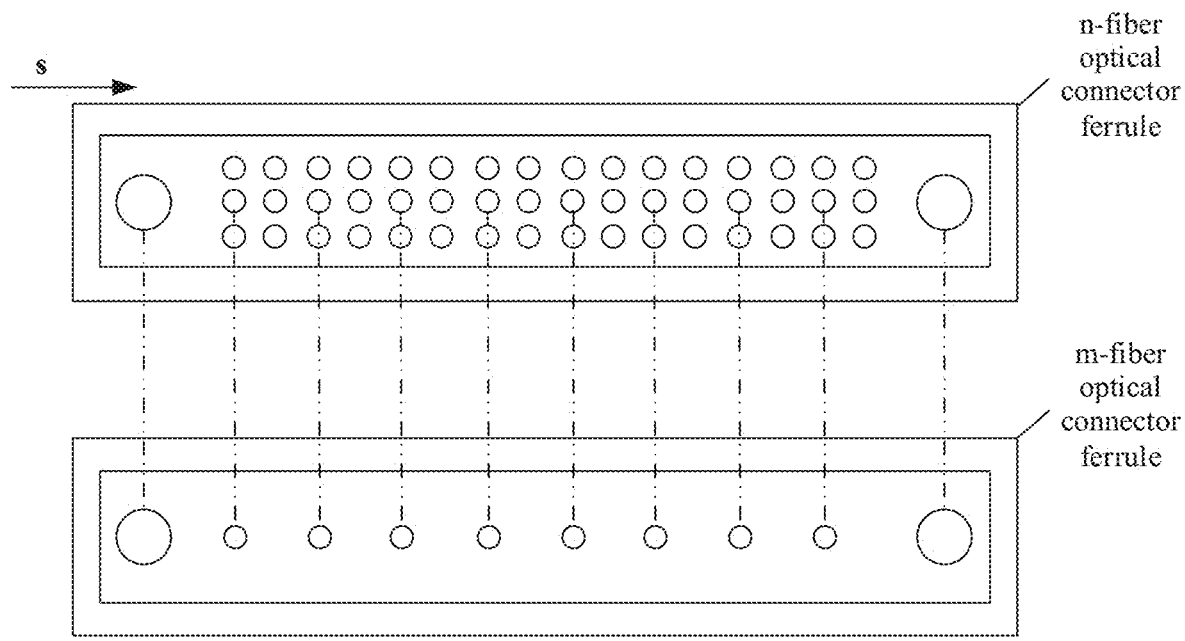
FIG. 8A is a schematic diagram in which a three-row n-fiber optical connector ferrule is compatible with a single-row m-fiber optical connector ferrule according to an embodiment of this application.
Figure 8B:
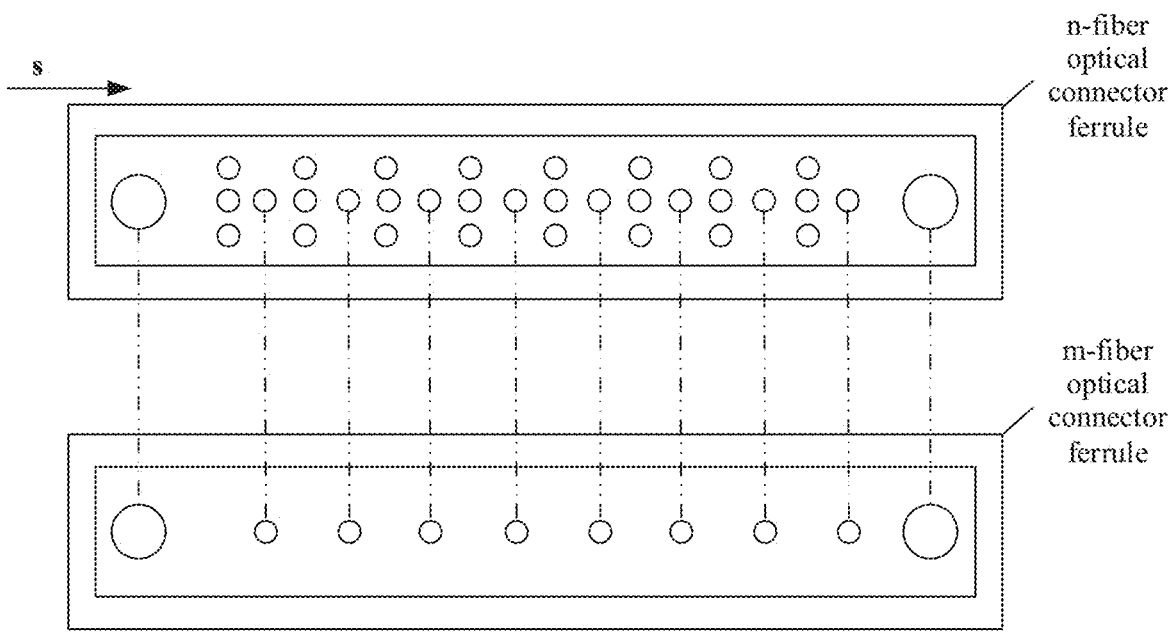
FIG. 8B is another schematic diagram in which a three-row n-fiber optical connector ferrule is compatible with a single-row m-fiber optical connector ferrule according to an embodiment of this application.

FIG. 8A is a schematic diagram in which a three-row n-fiber optical connector ferrule is compatible with a single-row m-fiber optical connector ferrule. An optical channel density in each row of the n-fiber optical connector ferrule shown in FIG. 8A is greater than an optical channel density in one row of the m-fiber optical connector ferrule. Referring to FIG. 8B, an optical channel density in only one row of a three-row n-fiber optical connector ferrule shown in the figure is greater than an optical channel density in one row of an m-fiber optical connector ferrule.

In the three-row n-fiber optical connector ferrule shown in FIG. 8A, only odd-numbered optical channels in the second row are first-type optical channels, and remaining optical channels are second-type optical channels. In the three-row n-fiber optical connector ferrule shown in FIG. 8B, only even-numbered optical channels in the second row are first-type optical channels, and remaining optical channels are second-type optical channels. That is, when an optical channel row quantity of an n-fiber optical connector ferrule is greater than an optical channel row quantity of an m-fiber optical connector ferrule, at least one of second-type optical channels of the n-fiber optical connector ferrule is located in a row other than a row in which first-type optical channels are located. Reference can be made to the first row and the second row in FIG. 8A and FIG. 8B. The first-type optical channels match optical channels of the in-fiber optical connector ferrule in a one-to-one correspondence. It can be learned from FIG. 8A and FIG. 8B that, an n-fiber optical connector ferrule with a larger quantity of rows is alternatively compatible with an m-fiber optical connector ferrule with a smaller quantity of rows.

Figure 8C:
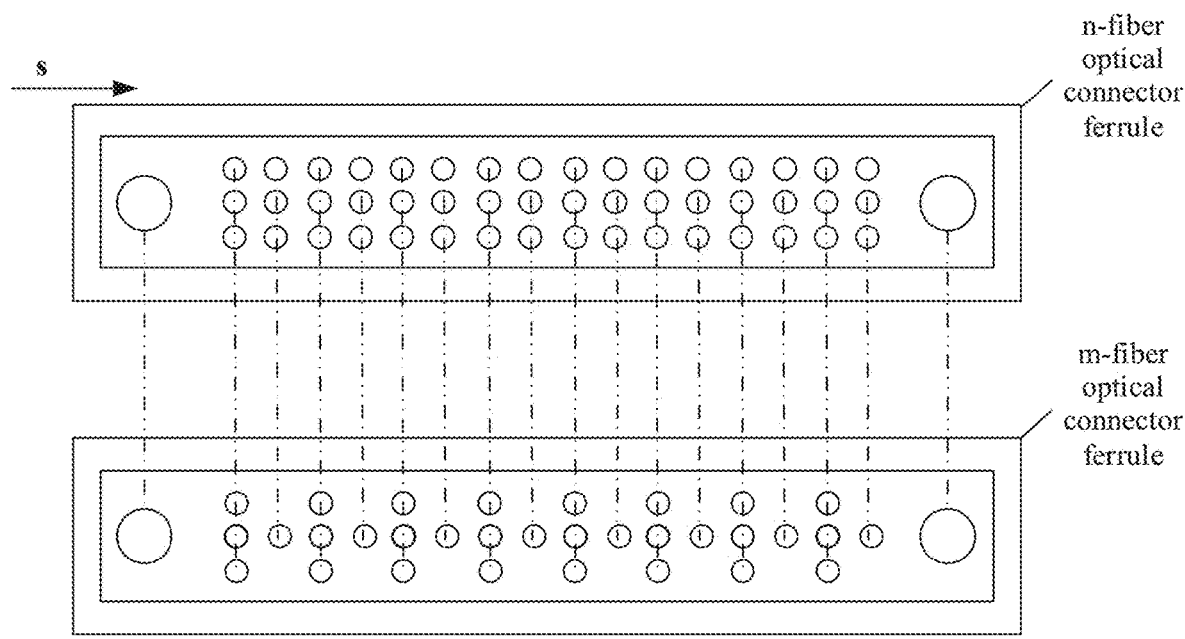
FIG. 8C is a schematic diagram in which a three-row n-fiber optical connector ferrule is compatible with a three-row m-fiber optical connector ferrule according to an embodiment of this application.

In actual application, an n-fiber optical connector ferrule can be interconnected to an n-fiber optical connector ferrule in a completely same channel arrangement manner, and is also compatible with a plurality of optical connector ferrules whose fiber quantities are less than n. With reference to FIG. 8A and FIG. 8C, a same n-fiber optical connector ferrule is compatible with a plurality of optical connector ferrules whose fiber quantities are less than n. In FIG. 8A, the two ferrules have different quantities of optical channel rows. For the m-fiber optical connector ferrule shown in FIG. 8A, all optical channels corresponding to the m-fiber optical connector ferrule in the n-fiber optical connector ferrule are first-type optical channels, and remaining channels are second-type optical channels. In FIG. 8C, two ferrules have a same quantity of optical channel rows. For an m-fiber optical connector ferrule shown in FIG. 8C, all optical channels corresponding to the m-fiber optical connector ferrule in an n-fiber optical connector ferrule are first-type optical channels. Therefore, it can be learned that first-type optical channels and second-type optical channels may be specifically classified based on an m-fiber optical connector ferrule that needs to be compatible.

It can be learned, with reference to FIG. 4 to FIG. 7 and FIG. 8A to FIG. 8C, that at least one of second-type optical channels of an n-fiber optical connector ferrule is located in at least one of rows in which first-type optical channels are located. In an implementation, at least one of the second-type optical channels may be specifically located between two adjacent first-type optical channels in a row direction. In another implementation, at least one of the second-type optical channels may be specifically located in front of the first first-type optical channel in a row direction, or specifically located behind the last first-type optical channel in a row direction.

According to the n-fiber optical connector ferrule provided in the foregoing embodiments, compatibility of the n-fiber optical connector ferrule with the m-fiber optical connector ferrule does not depend on increasing an optical channel row quantity, so that optical connector accuracy of the ferrule is not affected, and compatibility with a ferrule with a smaller quantity of fibers is also implemented.

The n-fiber optical connector ferrule described in the embodiments of this application may be implemented in a plurality of manners. The following describes these implementations one by one.

Figure 9:
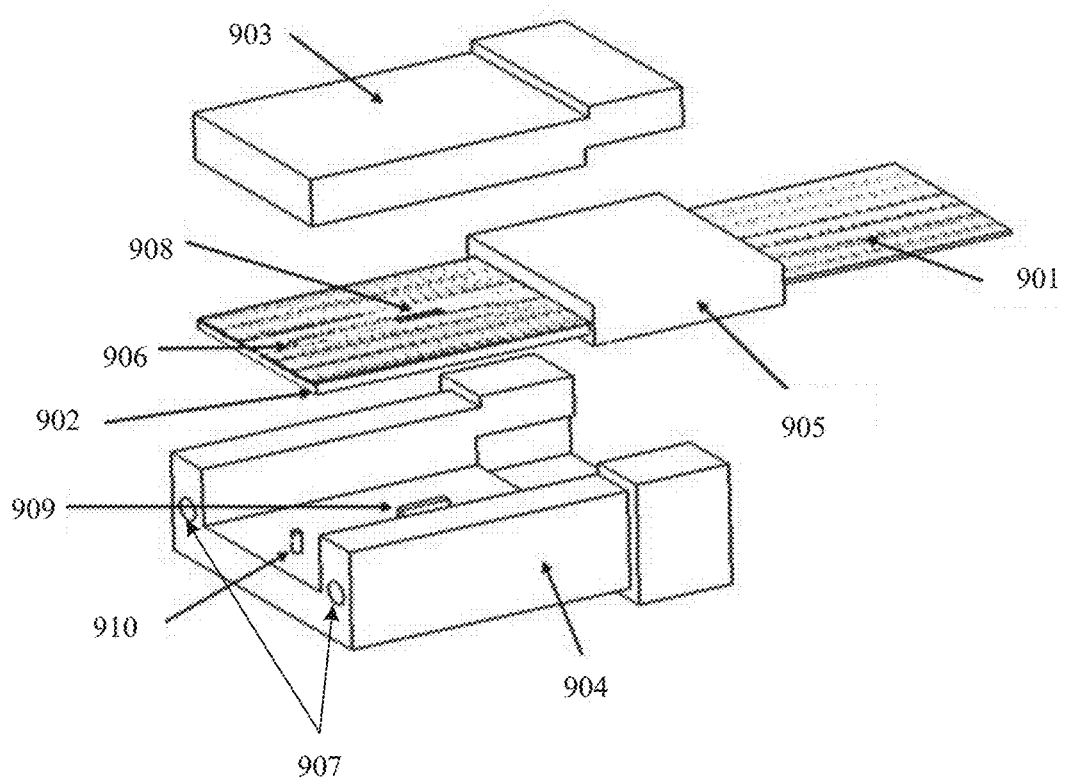
FIG. 9 is an exploded diagram of a structure of an optical connector ferrule of an optical waveguide type according to an embodiment of this application.

FIG. 9 is an exploded diagram of a structure of an optical connector ferrule of an optical waveguide type according to an embodiment of this application.

As shown in FIG. 9, the n-fiber optical connector ferrule includes a substrate 902, and n optical waveguide channels of the ferrule are disposed on the substrate 902. In a possible implementation, a waveguide plate 901 is located at an upper layer of the substrate 902, and the substrate 902 supports the waveguide plate 901. The n optical waveguide channels may be formed on the waveguide plate 901 by using a process such as printing or ion implantation. A spacing between at least two adjacent optical waveguide channels in the n optical waveguide channels is less than a spacing between any two adjacent optical channels of m optical channels of an m-fiber optical connector ferrule. In this way, the n-fiber optical connector ferrule is compatible with the m-fiber optical connector ferrule.

To protect the n optical waveguide channels of the optical connector ferrule and improve durability of the optical connector ferrule, in actual application, the substrate 902 and the waveguide plate 901 may be further embedded into an upper cover 903 and a body base 904. As shown in FIG. 9, a groove is disposed on the body base 904. During assembly, the substrate 902 and the waveguide plate 901 are specifically assembled into the groove of the body base 904, and a bottom surface of the substrate 902 is bonded to a bottom of the groove. Widths of the substrate 902 and the waveguide plate 901 are less than or equal to a width of the groove of the body base 904. Therefore, the substrate 902 and the waveguide plate 901 can be smoothly placed in the groove. In addition, a width of the upper cover 903 is also less than or equal to the width of the groove of the body base 904. After the substrate 902 and the waveguide plate 901 are placed into the groove, the upper cover 903 may also be placed into the groove, so that an overall appearance of the optical connector ferrule is smoother and more bonded. The upper cover 903 and the body base 904 are assembled through mutual fitting, so that the substrate 902 and the waveguide plate 901 can be fastened.

In a length direction of the ferrule, a tail jacket 905 is disposed around a middle position of a combination of the waveguide plate 901 and the substrate 902. The tail jacket 905 may be configured to protect the substrate 902 and the waveguide plate 901, to avoid damage of the substrate 902 and the waveguide plate 901 during assembling of the optical connector ferrule of the optical waveguide type. As shown in FIG. 9, to assemble the tail jacket 905, an upward groove is disposed on a contact surface of the upper cover 903 with the tail jacket 905, and a downward groove is disposed on a contact surface of the body base 904 with the tail jacket 905, so that the tail jacket 905 whose thickness is greater than a thickness sum of the substrate 902 and the waveguide plate 901 is installed between the upper cover 903 and the body base 904. As shown in FIG. 9, in an optical channel transmission direction (also referred to as the length direction of the ferrule) of the n-fiber optical connector ferrule, a length of the substrate 902 is less than a length sum obtained after the body base 904 is assembled with the tail jacket 905, and the length sum obtained after the body base 904 is assembled with the tail jacket 905 is less than a length of the waveguide plate 901.

In this embodiment of this application, to accurately position the optical waveguide channel, at least one first positioning mechanism is disposed on the substrate 902. The first positioning mechanism has a first preset position relationship with at least one of the n optical waveguide channels. For example, a positioning hole 906 is disposed on the substrate 902 as the first positioning mechanism, the optical connector ferrule includes a total of 32 optical waveguide channels, and in a width direction of the waveguide plate 901, the positioning hole 906 is located between the sixteenth optical waveguide channel and the seventeenth optical waveguide channel. Alternatively, for example, a distance between the positioning hole and the first optical waveguide channel in a row direction is equal to a distance between the positioning hole and the thirty-second optical waveguide channel in the row direction. The same can be applied to other channels. A distance between the positioning hole and the second optical waveguide channel is equal to a distance between the positioning hole and the thirty-first optical waveguide channel, and so on. Because the optical waveguide has the first preset position relationship with the first positioning mechanism, a position of each optical waveguide can be accurately determined by using the first positioning mechanism, and a position of the optical waveguide relative to the substrate can be determined by using the first positioning mechanism. During assembling of the optical connector ferrule, the body base 904 and the substrate 902 are mutually bonded, and at least one second positioning mechanism is disposed on a bonding surface of the body base 904. The first positioning mechanism matches the second positioning mechanism in position and size. In this embodiment of this application, one guide hole 907 is disposed on each of two sidewalls of the groove of the body base 904, and is configured to perform positioning through guide pin insertion when the optical connector ferrule is connected to a peer optical connector ferrule, referring to FIG. 3.

The second positioning mechanism has a second preset position relationship with guide holes 907. For example, the second positioning mechanism is respectively at equal distances from the guide holes 907 on two sides. Therefore, when the first positioning mechanism matches the second positioning mechanism, a mutual position between the optical channel of the substrate and the guide holes of the body base can be fixed. A position relationship between the optical waveguide channel and the guide holes 907 can be accurately obtained by using the first preset position relationship and the second preset position relationship.

That is, when the first positioning mechanism and the second positioning mechanism mutually match, positioning of the optical waveguide channel can be implemented by using the guide holes 907. Further, it is convenient to implement optical channel matching between ferrules at two ends by using guide holes 907 of the ferrules at the two ends during assembling of the ferrules at the two ends of an optical connector.

The optical waveguide channel formed in this embodiment of this application may be a single-mode optical waveguide channel, or may be a multi-mode optical waveguide channel. The optical waveguide plate 901 may be a single-layer optical waveguide, or may be a multi-layer optical waveguide or a combination of a plurality of optical waveguide plates 901 and the substrate 902. For example, optical channels are separately formed in different layers of optical waveguides. A thickness of the substrate 902 at a lower layer of the waveguide plate 901 may be adjusted (for example, the thickness of the substrate 902 is increased or the thickness of the substrate 902 is decreased) based on an actual requirement, to ensure accuracy of the mutual position between the optical waveguide channel and the guide holes 907 of the body base 904 after assembling of the ferrule.

As shown in FIG. 9, a positioning groove 908 on the substrate 902 and a positioning wedge 909 on the body base 904 are used as a pair of mutually matched first positioning mechanism and second positioning mechanism, and the positioning wedge 909 is inserted into the positioning groove 908 to implement matching. On this basis, the optical connector ferrule may further include another pair of first positioning mechanism and second positioning mechanism, namely, the positioning hole 906 on the substrate 902 and a positioning post 910 on the body base 904, and the positioning post 910 is inserted into the positioning hole 906 to implement matching. A quantity of first positioning mechanisms and a quantity of second positioning mechanisms are increased, so that accuracy of optical waveguide channel position matching between the ferrules can be further improved, thereby improving matching efficiency of the n-fiber optical connector ferrule with an optical connector ferrule with a same quantity of fibers, or improving an optical channel compatibility matching effect of the n-fiber optical connector ferrule with the m-fiber optical connector ferrule.

Figure 10:
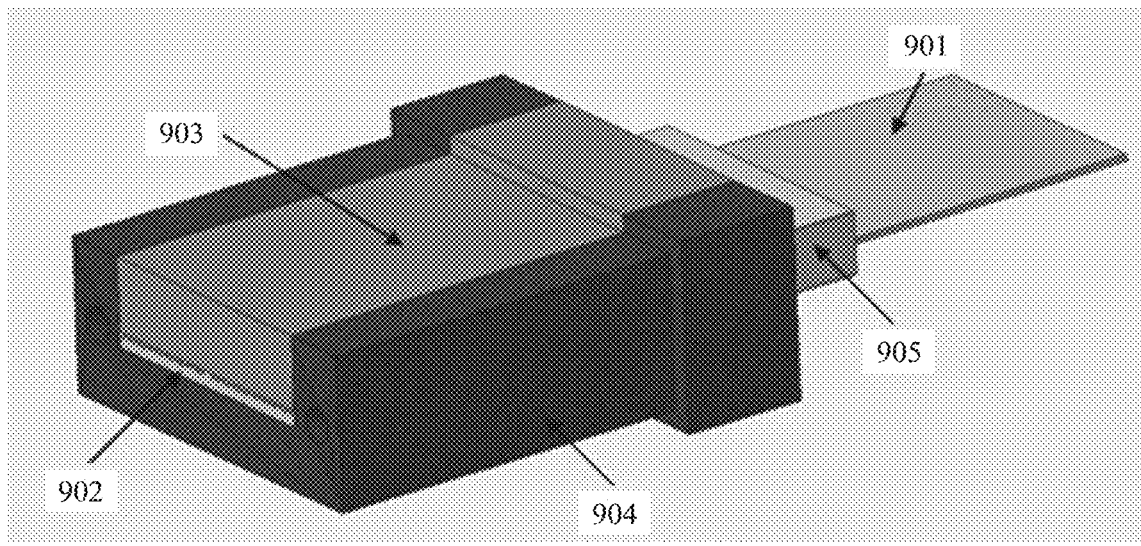
FIG. 10 is a schematic diagram obtained after assembling of the optical connector ferrule of the optical waveguide type in FIG. 9.

FIG. 10 is a schematic diagram obtained after assembling of the optical connector ferrule of the optical waveguide type in FIG. 9. As shown in FIG. 10, the optical connector ferrule of the optical waveguide type has a smooth and bonded upper surface because the upper cover 903 is embedded into the groove of the body base 904. An end surface of the optical waveguide connector is interconnected to the peer optical connector ferrule through fitting, to ensure optical path coupling inside the optical connector. The optical waveguide channels formed on the waveguide plate 901 that extends from the tail jacket 905 are configured to establish an optical connection to a first optical communication device in an optical communication scenario. After the optical connector ferrule that is of the optical waveguide type and that is shown in FIG. 10 and the peer ferrule are assembled into the optical connector, optical coupling between the first optical communication device and a second optical communication device is implemented. Specific types of the first optical communication device and the second optical communication device are not limited herein.

In the foregoing embodiment, the n-fiber optical connector ferrule with the n optical waveguide channels is implemented by performing printing or ion implantation on the waveguide plate 901. In addition, an n-fiber optical connector ferrule with n fiber channels may be alternatively manufactured by using an injection molding process. With reference to embodiments and accompanying drawings, the following describes a die used for injection molding processing and an optical connector ferrule that is of an optical fiber type and that is obtained through injection molding.

Figure 11:
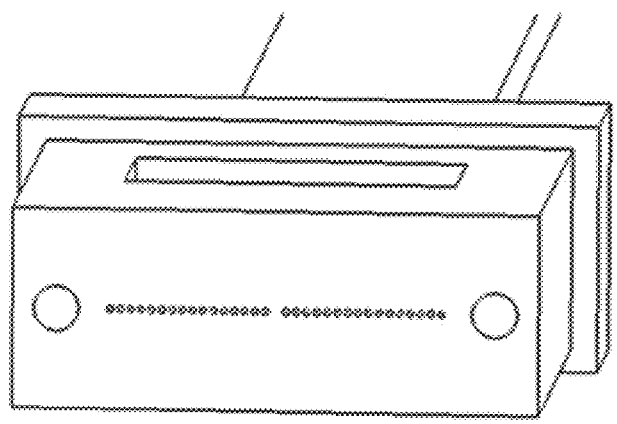
FIG. 11 is a schematic diagram of a structure of an optical connector ferrule of an optical fiber type according to an embodiment of this application.

FIG. 11 is a schematic diagram of a structure of an optical connector ferrule of an optical fiber type.

As shown in FIG. 11, the optical connector ferrule includes a body, and n fiber channels obtained through injection molding processing and two guide holes whose cross-sectional diameters are greater than a diameter of the fiber channel are disposed on the body. The two guide holes are located on two sides of the body, and the fiber channels are located between the two guide holes in a row direction. The guide holes are configured to perform positioning when the optical connector ferrule (a first ferrule) of the optical fiber type at a local end is assembled with guide pins disposed on a peer ferrule (a second ferrule). For an assembling relationship between the ferrule and the guide pins, refer to FIG. 3.

Figure 12:
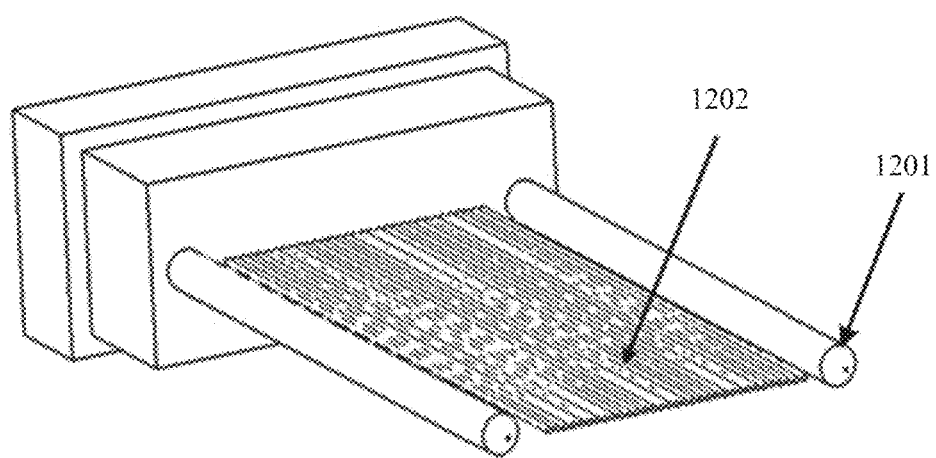
FIG. 12 is a schematic diagram of a die with die core pins according to an embodiment of this application.

The n fiber channels shown in FIG. 11 may be obtained after injection molding is performed by using separate die core pins as a die. Referring to FIG. 12, this figure shows an injection die with n+2 die core pins, where two die core pins 1201 with larger diameters are configured to form the guide holes, and n die core pins 1202 with smaller diameters are configured to form the fiber channels. If a spacing between adjacent fiber channels in n the fiber channels is 125 μm, the diameter of the fiber channel is required to be less than 125 μm. An optical fiber whose diameter is less than 125 μm needs to be customized to form the optical connector ferrule of the optical fiber type. As an example, a diameter of the die core pin 1202 configured to form the fiber channel is between 50 μm and 90 μm.

It can be learned from the foregoing embodiment description that, in this application, a density of die core pins in the die in the row direction may be increased, to reduce the spacing between the fiber channels, so that the formed optical connector ferrule of the optical fiber type is compatible with an optical connector ferrule with a smaller quantity of channels. For example, a 32-fiber ferrule with a channel spacing of 125 μm is compatible with a 16-fiber ferrule with a channel spacing of 250 μm.

Figure 13:
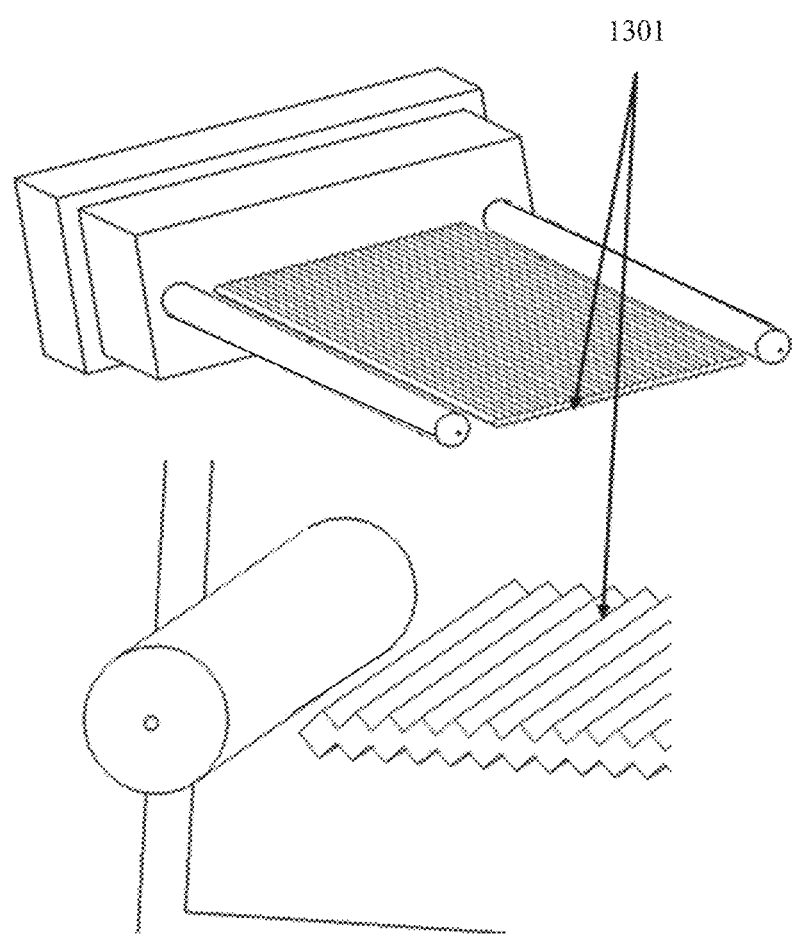
FIG. 13 is a schematic diagram of a die with a two-sided W-shaped die core block according to an embodiment of this application.
Figure 14:
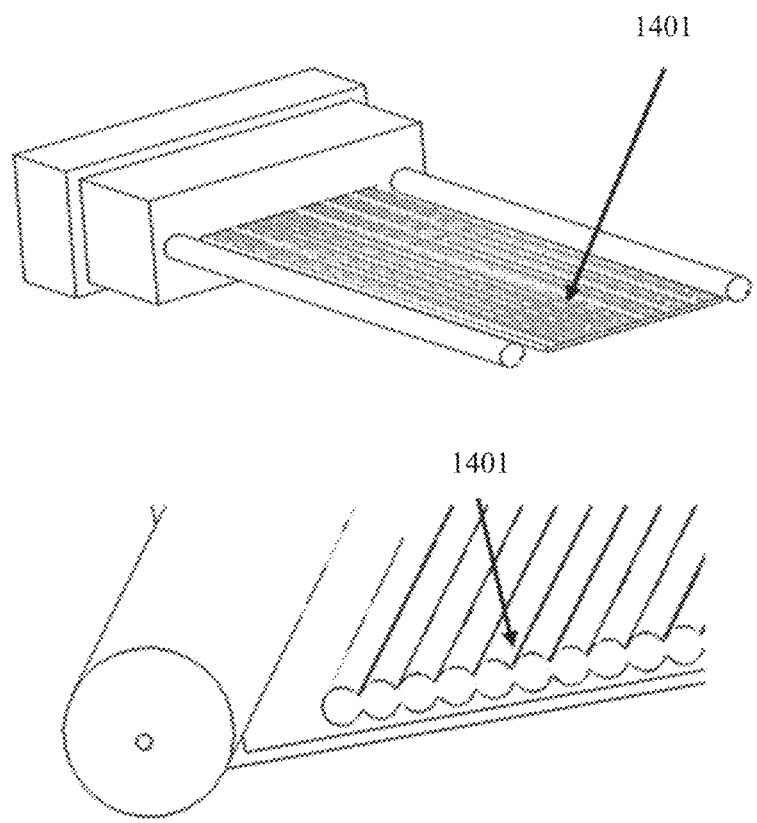
FIG. 14 is a schematic diagram of a die with a two-sided arched die core block according to an embodiment of this application.

In addition, in this embodiment of this application, a die core block may be used as a die to obtain n connected fiber channels through injection molding. FIG. 13 and FIG. 14 respectively show two different dies.

Figure 15:
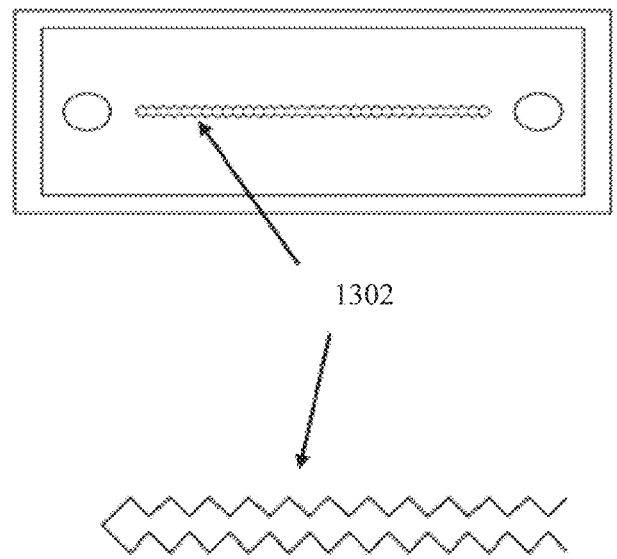
FIG. 15 is a cross-sectional view of a ferrule formed by using the die in FIG. 13.

In FIG. 13, both an upper surface and a lower surface of a die core block 1301 configured to firm fiber channels in a die are serrated, in other words, the upper surface is serrated, and the lower surface is also serrated. For example, the serrated may be specifically V-shaped. An optical connector ferrule that is of an optical fiber type and that is formed by using the die in FIG. 13 is shown in FIG. 15, and n fiber channels included in the ferrule are connected and upper surfaces and lower surfaces of the n fiber channels are also serrated, for example, cross-sections of the fiber channels are connected upper-and-lower dual-V-shaped 1302. That is, in an optical channel row direction, the upper surface of the die core block 1301 is serrated, and the lower surface is also serrated. For example, in an optical channel column direction, an upper edge of a cross-section of a single fiber channel is V-shaped, and a lower edge is also V-shaped.

Figure 16:
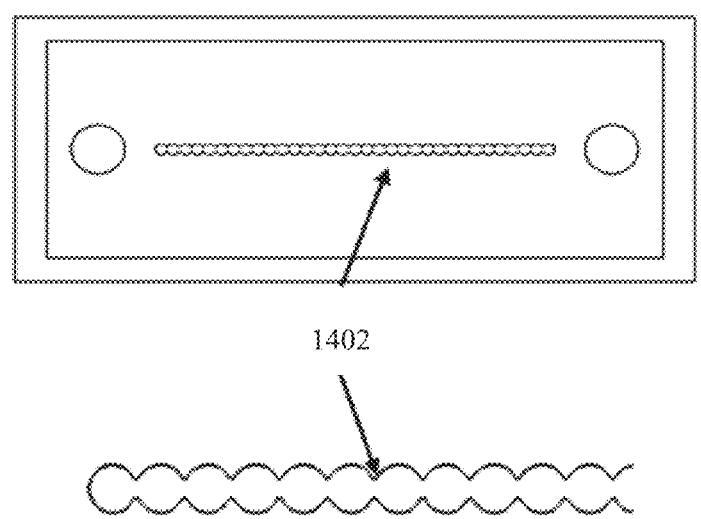
FIG. 16 is a cross-sectional view of a ferrule formed by using the die in FIG. 14.
Figure 17:
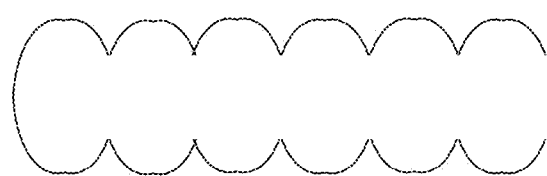
FIG. 17 is a cross-sectional view of connected dual-U-shaped optical channels.

In FIG. 14, both an upper surface and a lower surface of a die core block 1401 configured to form fiber channels in a die are arched. Arch curvature in FIG. 14 remains unchanged. An optical connector ferrule that is of an optical fiber type and that is formed by using the die in FIG. 14 is shown in FIG. 16, and n fiber channels included in the ferrule are connected and both upper surfaces and lower surfaces of the n fiber channels are arched 1402. It may be understood that, if arch curvature in FIG. 14 changes, a cross-section of a single fiber channel formed by using the die may be alternatively connected upper-and-lower double-arched. Reference can be made to a connected double-arched channel cross-section shown in FIG. 17. That is, in an optical channel column direction, an upper edge of a cross-section of a single fiber channel is arched, and a lower edge is also arched.

In this embodiment of this application, the spacing between two adjacent fiber channels is 125 μm. Therefore, a standard optical fiber with a diameter of 125 μm may be used to form the optical connector ferrule of the optical fiber type. In a process of forming the connected fiber channels through injection molding by using the die core block, because the die core block is not prone to deformation, it can be ensured that the formed fiber channels have relatively high position accuracy.

The fiber channel formed in this embodiment of this application may be a single-mode fiber channel, or may be a multi-mode fiber channel. In actual application, a size-matched die may be used for injection molding to obtain a single-mode fiber channel or a multi-mode fiber channel.

According to the optical connector ferrule that is of the optical fiber type and that is provided in this embodiment of this application, the fiber channels of the optical connector ferrule may be distributed in one row, or may be distributed in a plurality of rows. For a compatibility effect of one row of fiber channels with an m-fiber optical connector ferrule, refer to FIG. 4 to FIG. 6. For a compatibility effect of a plurality of rows of fiber channels with an m-fiber optical connector ferrule, refer to FIG. 7, FIG. 8A, and FIG. 8B. In a row direction, there may be a same spacing between two adjacent optical channels, as shown in FIG. 4, FIG. 5, FIG. 7, and FIG. 8A, or there may be different spacings between two adjacent optical channels, as shown in FIG. 6.

Both the n-fiber optical connector ferrule of the optical waveguide type and the n-fiber optical connector ferrule of the optical fiber type that are provided in the embodiments of this application may support compatibility with an m-fiber optical connector ferrule. Assuming that the m-fiber optical connector ferrule is a previous-generation product of the n-fiber optical connector ferrule, the n-fiber optical connector ferrule provided in the embodiments of this application supports compatibility with a previous-generation product. To be compatible with the m-fiber ferrule, a value of n may be m+1 to 2m. The following uses examples for description:

A single-row 17 to 32-fiber optical connector ferrule with a minimum optical channel spacing of 125 μm is compatible with a single-row 16-fiber optical connector ferrule with a spacing of 250 μm, and a single-row 13 to 24-fiber optical connector ferrule with a minimum optical channel spacing of 125 μm is compatible with a single-row 12-fiber optical connector ferrule with a spacing of 250 μm.

A two-row 33 to 64-fiber optical connector ferrule with a minimum optical channel spacing of 125 is compatible with a two-row 32-fiber optical connector ferrule with a spacing of 250 μm, and a two-row 25 to 48-fiber optical connector ferrule with a minimum optical channel spacing of 125 μm is compatible with a two-row 24-fiber optical connector ferrule with a spacing of 250 μm.

A three-row 49 to 96-fiber optical connector ferrule with a minimum optical channel spacing of 125 μm is compatible with a three-row 48-fiber optical connector ferrule with a spacing of 250 μm, and a three-row 37 to 72-fiber optical connector ferrule with a minimum optical channel spacing of 125 μm is compatible with a three-row 36-fiber optical connector ferrule with a spacing of 250 μm.

Figure 18:
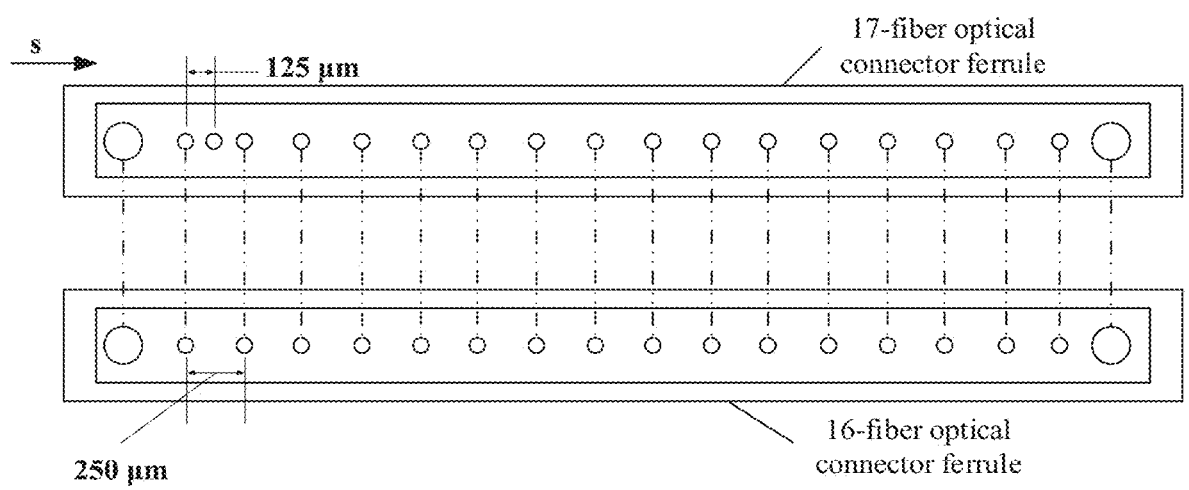
FIG. 18 is a schematic diagram of a compatibility effect of a 17-fiber optical connector ferrule with a 16-fiber optical connector ferrule.

For a compatibility effect of a single-row 17-fiber optical connector ferrule with a minimum optical channel spacing of 125 μm with a single-row 16-fiber optical connector ferrule with an optical channel spacing of 250 μm, refer to FIG. 18. Implementations of the foregoing other examples are all variants of the implementation in FIG. 18. Reference can be made to FIG. 18, and the implementations are not described one by one in the embodiments of this application.

Based on the optical connector ferrule provided in the foregoing embodiments, correspondingly, this application further provides an optical connector.

The optical connector includes a first ferrule and a second ferrule. For the first ferrule, refer to the first ferrule 301 in FIG. 3. For the second ferrule, refer to the second ferrule 302 in FIG. 3.

In a possible implementation, the first ferrule is a ferrule that is formed according to any one of the manners described in the foregoing embodiments and that has compatibility with the second ferrule; and the second ferrule is an existing product in the current industry, but a fiber quantity of the second ferrule is less than a fiber quantity of the first ferrule. It can be learned, with reference to the foregoing description, that the first ferrule is compatible with the second ferrule because the first ferrule includes first-type optical channels.

In another possible implementation, the first ferrule and the second ferrule each are a ferrule formed according to any one of the manners described in the foregoing embodiments. The first ferrule is compatible with the second ferrule whose fiber quantity is less than that of the first ferrule, and the second ferrule is also compatible with another ferrule whose fiber quantity less than that of the second ferrule. In this implementation, an optical channel implementation of the first ferrule may be the same as or may be different from that of the second ferrule. FIG. 3 shows only an example in which the first ferrule 301 is an optical connector ferrule of an optical fiber type and the second ferrule 302 is an optical connector ferrule of an optical waveguide type.

For example, in an implementation, both the first ferrule and the second ferrule may be alternatively optical connector ferrules of the optical waveguide type.

For another example, in another implementation, both the first ferrule and the second ferrule may be alternatively optical connector ferrules of the optical fiber type.

A specific row quantity of the ferrule and an optical channel quantity of each row are not specifically limited in this embodiment.

It should be understood that, in this application, "at least one" means one or more, and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing descriptions are merely example embodiments of this application, and are not intended to limit this application in any form. Although the example embodiments of this application are disclosed above, embodiments are not intended to limit this application, By using the method and the technical content disclosed above, any person of ordinary skill in the art can make a plurality of possible changes and modifications on the technical solutions of this application, or amend the technical solutions thereof to be embodiments with equal effects through equivalent variations without departing from the protection scope of the technical solutions of this application. Therefore, any simple modification, equivalent change, and modification made to the foregoing embodiments based on the technical essence of this application without departing from the content of the technical solutions of this application all still fall within the protection scope of the technical solutions of this application.

What is claimed is:

1. An optical connector ferrule, wherein the optical connector ferrule is a first ferrule of an optical connector, wherein:
   the first ferrule comprises n optical channels;
   the first ferrule is configured to be compatible with a second ferrule, the second ferrule comprises m optical channels, both m and n are positive integers, and n is greater than m; and
   the n optical channels of the first ferrule comprise first-type optical channels and second-type optical channels, an arrangement manner of the first-type optical channels is the same as that of the m optical channels of the second ferrule, and at least one of the second-type optical channels is located in at least one of rows in which the first-type optical channels are located.

2. The optical connector ferrule according to claim 1, wherein the at least one of the second-type optical channels is located between two adjacent first-type optical channels in a row direction.

3. The optical connector ferrule according to claim 1, wherein an optical channel row quantity of the first ferrule is the same as an optical channel row quantity of the second ferrule.

4. The optical connector ferrule according to claim 1, wherein an optical channel row quantity of the first ferrule is greater than an optical channel row quantity of the second ferrule.

5. The optical connector ferrule according to claim 1, wherein there is equal spacing between every two adjacent optical channels in a same row in the n optical channels, and there is equal spacing between every two adjacent optical channels in a same row in the m optical channels.

6. The optical connector ferrule according to claim 5, wherein spacing between every two adjacent optical channels in all rows in the n optical channels is d1, spacing between every two adjacent optical channels in all rows in the m optical channels is d2, d1 is 1/K times of d2, and K is a positive integer greater than or equal to 2.

7. The optical connector ferrule according to claim 1, wherein:
   the n optical channels are n optical waveguide channels; and
   the first ferrule further comprises a substrate, and the n optical waveguide channels are disposed on the substrate.

8. The optical connector ferrule according to claim 7, wherein:
   the first ferrule further comprises a body base and an upper cover;
   a groove is disposed on the body base, the substrate is assembled into the groove, a bottom surface of the substrate is bonded to a bottom of the groove, and at least one first positioning mechanism is disposed on a bonding surface of the groove with the substrate;
   a second positioning mechanism that matches the first positioning mechanism is disposed on the substrate, and the first positioning mechanism matches the second positioning mechanism to fasten the substrate and the groove; and
   the upper cover fits the body base to fasten the substrate.

9. The optical connector ferrule according to claim 8, wherein the second positioning mechanism comprises a positioning wedge located in the groove, the first positioning mechanism comprises a positioning groove located on the substrate, and the positioning wedge matches the positioning groove.

10. The optical connector ferrule according to claim 9, wherein the second positioning mechanism further comprises a positioning post located in the groove, the first positioning mechanism further comprises a positioning hole located on the substrate, and the positioning post matches the positioning hole.

11. The optical connector ferrule according to claim 7, wherein:
    a tail jacket is disposed on the substrate to protect the substrate; and
    in a length direction of the first ferrule, a length sum obtained after a body base is assembled with the tail jacket is greater than a length of the substrate.

12. The optical connector ferrule according to claim 1, wherein:
    the n optical channels are n fiber channels, and the first ferrule further comprises a body;
    the n fiber channels are disposed on the body, and two sides of the body comprise guide holes; and
    when the first ferrule is connected to the second ferrule, the guide holes are configured to match guide pins disposed on the second ferrule to perform positioning.

13. The optical connector ferrule according to claim 12, wherein the n fiber channels are formed through injection molding by using a die core block, both an upper surface and a lower surface of the die core block are serrated, and the n fiber channels are connected optical channels and both upper surfaces and lower surfaces of the n fiber channels are serrated.

14. The optical connector ferrule according to claim 12, wherein the n fiber channels are formed through injection molding by using a die core block, both an upper surface and a lower surface of the die core block are arched, and the n fiber channels are connected optical channels and both upper surfaces and lower surfaces of the n fiber channels are arched.

15. The optical connector ferrule according to claim 12, wherein a diameter of each fiber channel is less than or equal to 125 μm.

16. An optical connector, comprising a first ferrule and a second ferrule, wherein the first ferrule and the second ferrule are connected together to form the optical connector, and wherein:
    the first ferrule comprises n optical channels;
    the first ferrule is configured to be compatible with the second ferrule, the second ferrule comprises m optical channels, both m and n are positive integers, and n is greater than m; and
    the n optical channels of the first ferrule comprise first-type optical channels and second-type optical channels, an arrangement manner of the first-type optical channels is the same as that of the m optical channels of the second ferrule, and at least one of the second-type optical channels is located in at least one of rows in which the first-type optical channels are located.

17. The optical connector according to claim 16, wherein the at least one of the second-type optical channels is located between two adjacent first-type optical channels in a row direction.

18. The optical connector according to claim 16, wherein an optical channel row quantity of the first ferrule is the same as an optical channel row quantity of the second ferrule.

19. The optical connector according to claim 16, wherein an optical channel row quantity of the first ferrule is greater than an optical channel row quantity of the second ferrule.

20. The optical connector according to claim 16, wherein there is equal spacing between every two adjacent optical channels in a same row in the n optical channels, and there is equal spacing between every two adjacent optical channels in a same row in the m optical channels.

\* \* \* \* \*